(12) United States Patent
Sugiyama et al.

(10) Patent No.: US 6,367,448 B1
(45) Date of Patent: Apr. 9, 2002

(54) ENGINE CONTROL

(75) Inventors: Fumitoshi Sugiyama; Mamoru Yoneyama; Sadao Nogi, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/448,001

(22) Filed: Nov. 23, 1999

(30) Foreign Application Priority Data

Nov. 24, 1998 (JP) .......................................... 10-332878

(51) Int. Cl.[7] .............................................. F02D 41/04
(52) U.S. Cl. ....................... 123/399; 123/306; 123/360; 123/401
(58) Field of Search ................................ 123/308, 306, 123/360, 389, 401, 399, 336

(56) References Cited

U.S. PATENT DOCUMENTS

| 4,144,852 | A | * | 3/1979  | Kawai et al. ................ 123/320 |
| 4,232,640 | A | * | 11/1980 | Matsumoto et al. ......... 123/308 |
| 4,271,801 | A | * | 6/1981  | Yamakawa et al. .......... 123/308 |
| 4,318,273 | A | * | 3/1982  | Nohira et al. ................ 123/308 |
| 4,359,982 | A | * | 11/1982 | Yoshioka et al. ............ 123/320 |
| 4,528,958 | A | * | 7/1985  | Yoshida et al. .............. 123/432 |
| 5,394,846 | A | * | 3/1995  | Jaeger et al. ................. 123/336 |
| 5,640,941 | A | * | 6/1997  | Hazen et al. ................. 123/306 |

* cited by examiner

Primary Examiner—Henry C. Yuen
Assistant Examiner—Arnold Castro
(74) Attorney, Agent, or Firm—Ernest A. Beutler

(57) ABSTRACT

An induction control system for an internal combustion engine and an operator for controlling the control valve. The system operates so as to move the control valve between an unrestricted flow position and another position wherein the flow velocity or direction is changed. The valve is moved between these positions at varying rates depending upon the engine running condition so as to provide quicker response under some conditions than others.

10 Claims, 7 Drawing Sheets

ENGINE CONTROL

BACKGROUND OF THE INVENTION

This invention relates to an engine control and more particularly to an improved engine control for the induction system of an internal combustion engine to improve engine performance during transitional running conditions.

As is well known, in many applications internal combustion engines run over widely varying range of conditions of both speed and load. This is particularly true when the engine is employed for powering a motor vehicle be it operated on either land or water. It is, of course, desirable if the engine runs at optimum performance under each of the varying conditions it is required to run. This presents significant difficulties because of the inherent nature of many of the systems of internal combustion engines.

The induction system is one area where this condition of desired flexibility presents significant difficulties. An induction system that is designed so as to provide maximum power output, will not be efficient at low speeds and low loads. In a like manner, an engine designed to provide optimum performance at low speeds will not achieve large maximum power outputs or speeds. Therefore, various devices have been proposed varying the operating conditions or characteristics of an induction system over the running range of the engine to provide more optimal performance under each running condition.

One way that this is done is through the utilization of a flow controlling valve in the induction system. The flow controlling valve is movable between a opened position wherein no substantial restriction to air flow is encountered and the air flows into the combustion chamber in a relatively straight fashion so, as to achieve maximum charging and maximum power under high load high speed conditions. Under other running conditions, the flow into the combustion chamber is either restricted and/or redirected so as to introduce turbulence in the combustion chamber. This will improve running under lower speed and lower load conditions.

A wide variety of types of flow control valves and control strategies have been proposed for achieving this optimal running. However, the systems generally operate in response to fixed parameters and set the optimum position for a fixed running condition of speed and load.

However, because the speed and load of the engine may change continuously, transient conditions present problems of their own. Although control strategies have been proposed for controlling the transient conditions, these basically operate to provide a set condition of the valve during the transient condition. Thus, this itself represents a compromise that does not provide optimum engine performance.

It is, therefore, a principal object of this invention to provide an improved engine control and specifically an induction system control for an engine to offer optimal performance under transient conditions.

It is a further object of this invention to provide an improved induction control system for an engine wherein the control valve has not only its position changed in response to changed running conditions but also the rate of change of the position of the valve is controlled.

It is a further object of this invention to provide an improved control valve system and operating mechanism therefore that permits not only adjustment in the position of the valve but in the rate of change of the valve position.

SUMMARY OF THE INVENTION

A first feature of the invention is adapted to be embodied in an internal combustion engine induction control valve and method of operating the valve to improve performance under transient conditions. A flow control valve is positioned in the induction system and is movable between a first wide open position wherein the direction of flow into the combustion chamber is generally unaltered as well as providing a minimal change in the effective flow area and another position wherein the flow into the combustion chamber is either restricted and/or redirected. A control senses engine conditions for positioning the induction control valve.

In accordance with an apparatus for performing the invention, the control is operative to sense the rate of change of engine running conditions and to alter the rate of change in position of the control valve in response to sensed transient conditions.

In accordance with a method for practicing the invention, the engine conditions including a rate of change in engine running condition is measured. The control valve is then positioned in a position and at a rate of change to suit the measured conditions to including rate of change to provide optimal performance.

Another feature of the invention is adapted to be embodied in a control motor for controlling the operation of an induction control valve in an internal combustion engine induction system. The control valve is positioned by a diaphragm type motor having one chamber that is exposed to a predetermined force for moving the valve in one direction. The other side of the diaphragm is exposed to a source of pressure and communicates with this source of pressure either in an unrestricted or in a restricted fashion depending upon the engine running condition so as to vary the rate of change in position of the control valve.

DETAILED DESCRIPTION OF THE PREFERRED EMBODIMENTS

Figure 1:
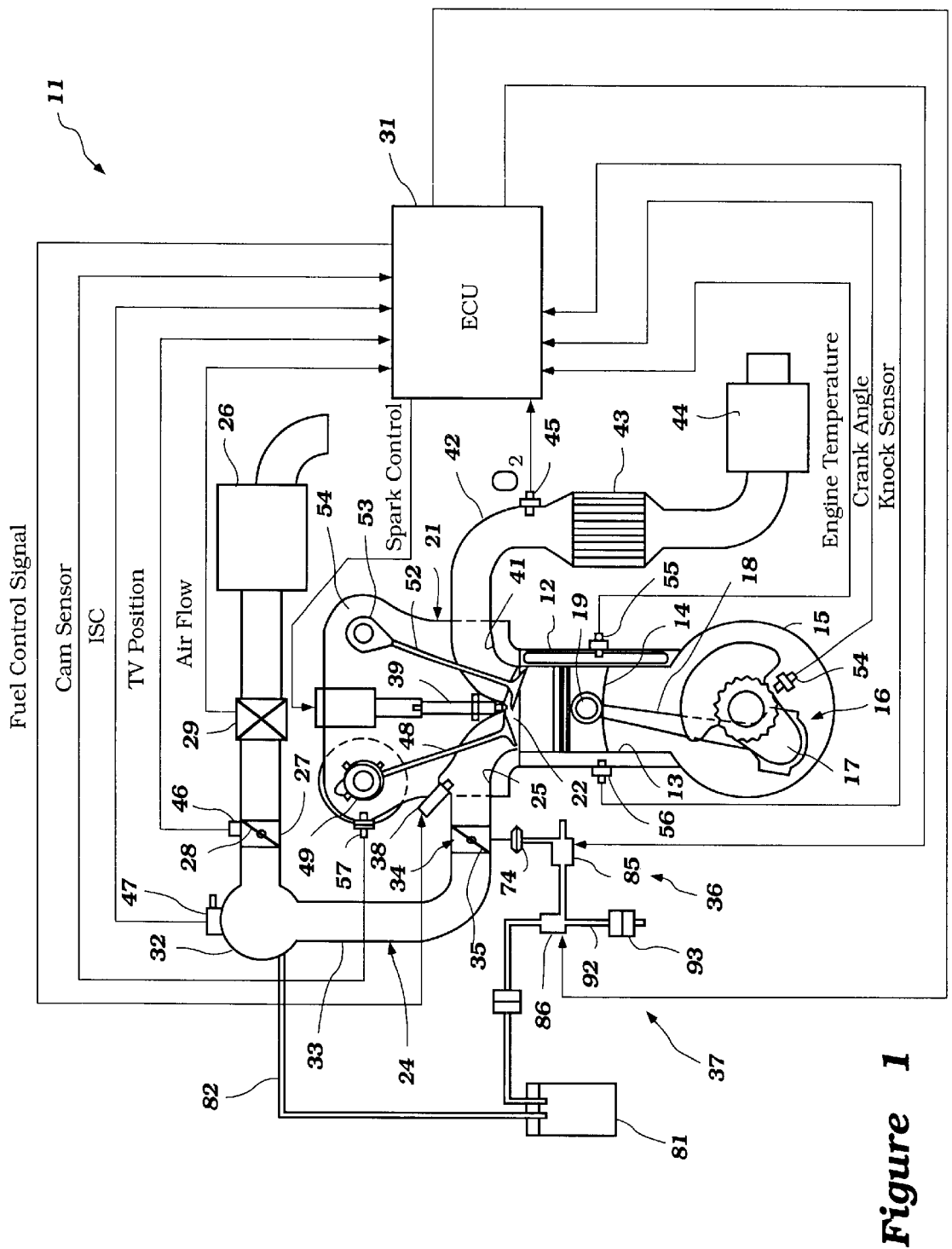
FIG. 1 is a partial schematic cross-sectional view taken through one cylinder of a multiple cylinder internal combustion engine constructed and operated in accordance with an embodiment of the invention with portions of the control system shown schematically.

Referring now in detail to the drawings and initially primarily to FIG. 1, an internal combustion engine and control system therefore constructed and operated in accordance with an embodiment of the invention is indicated generally by the reference numeral 11. The engine 11 is, in the illustrated embodiment, of the inline type and operates on a four stroke principal. Although the invention is described in conjunction with an engine having such configuration and operating on a four stroke principal, it will be readily apparent to those skilled in the art how the invention can be practiced with engines having other cylinder numbers and other cylinder configurations and, in some instances, with two cycle engines. Also, although the invention is described in conjunction with a reciprocating engine, it also may be employed with rotary engines, as will be apparent to those skilled in the art.

The engine 11 is comprised of cylinder block 12 having one or more inline cylinder bores 13 in which pistons 14 reciprocate. The cylinder bores 13 are closed at their lower end by a crankcase assembly formed from a crankcase member 15 that is affixed to the cylinder block 12 in a known manner and which rotatably journals a crankshaft 16.

The crankshaft 16 has throws 17 onto which the big ends of connecting rods 18 are journaled. The small ends of the connecting rods 18 are connected to the pistons 14 by piston pins 19 for transmitting the reciprocation of the pistons 14 and the cylinder bores 13 into rotation of the crankshaft 16 about its axis.

The ends of the cylinder bores 13 opposite the crankcase are closed by a cylinder head assembly, indicated generally by the reference numeral 21 and which is affixed in a suitable manner to the cylinder block 12. Although a detachable cylinder head arrangement is illustrated and described, it will be readily apparent to those skilled in the art how the invention can be practiced with engines in which the cylinder head assembly 21 or its main body portion is formed integrally with the cylinder block 12.

The cylinder head assembly 21 has recesses 22 formed in its lower surface which cooperate with the cylinder bores 13 and the heads of the pistons 14 to define the variable volume combustion chambers of the engine. Because, at top dead center position of the piston 14, the recess 22 forms the substantial portion of the combustion chamber volume, at times this reference numeral will also be utilized to designate the combustion chamber. This recess surface is shown in more detail in FIGS. 3 and 4 and indicated in those figures by the reference numeral 23.

An induction system, indicated generally by the reference numeral 24 is provided for delivering an air charge to the engine combustion chambers 22 through an intake passage arrangement 25 formed in the cylinder head assembly 21 and which will be described in more detail later by particular reference to FIGS. 2–4.

This induction system 24 includes an air inlet device 26 which draws atmospheric air from the area surrounding the engine 11 and delivers it to a main throttle body 27 in which a manually or electronically operated flow controlling throttle valve 28 is positioned. An air flow meter 29 is interposed in the induction system 24 between the air inlet device 26 and the throttle body 27. This flow controlling device provides a signal indicative of air flow to an ECU, indicated generally by the reference numeral 31 which provides a control strategy for operation of the engine including an arrangement for providing the induction control which forms a major part of the invention in this case.

The throttle body 27 delivers the air to a plenum chamber, indicated by the reference numeral 32, which may form a portion of an intake manifold. This plenum chamber 32 has individual runner sections 33 which extend to the cylinder head intake passages 25.

Disposed immediately upstream of the cylinder head intake passages 25, is flow control valve body 34 in which flow control valves 35 are positioned for controlling both the velocity and direction of air flow into each of the combustion chambers 22 in a manner which will be described later again by more particular reference to FIGS. 2–4.

This flow control valve 35 is operated by a servo mechanism, indicated generally by the reference numeral 36 which forms a part of the overall induction control system, indicated generally by the reference numeral 37. Again, this structure will be described in more detail shortly.

In addition to the air charge which is supplied by the induction system 24, fuel is supplied to the combustion chambers 22 in a suitable manner. This may include a manifold type fuel injection system that includes fuel injectors 38 which are mounted in the cylinder head assembly 21. These fuel injectors 38 are controlled by the ECU 31 in accordance with a desired control strategy. Although manifold type injection system is illustrated in this embodiment, it will be readily apparent to those skilled in the art that the invention can be utilized with a wide variety of types of charge formers and fuel injectors including direct cylinder fuel injection.

A suitable fuel supply system including a fuel rail supplies fuel to the fuel injectors 38. Since the specific form of charge former is not critical to the invention, this structure is not illustrated. Those skilled in the art will readily understand how the invention can be practiced with a wide variety of types of charge formers and fuel supplies therefore.

Figure 2:
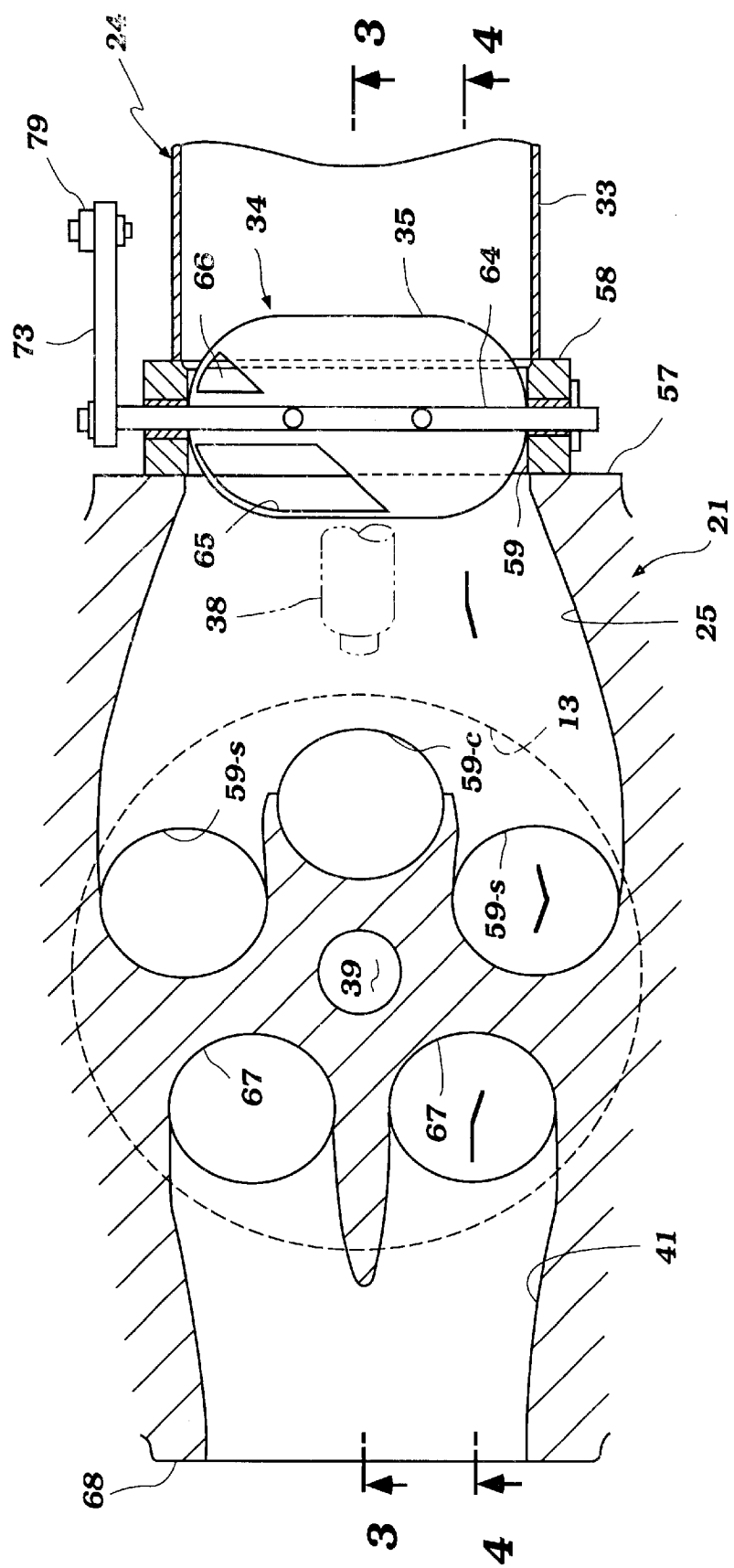
FIG. 2 is an enlarged cross-sectional view taken perpendicular to the plane of FIG. 1 and showing the combustion chamber and intake passage arrangement including the control valve therefore.
Figure 3:
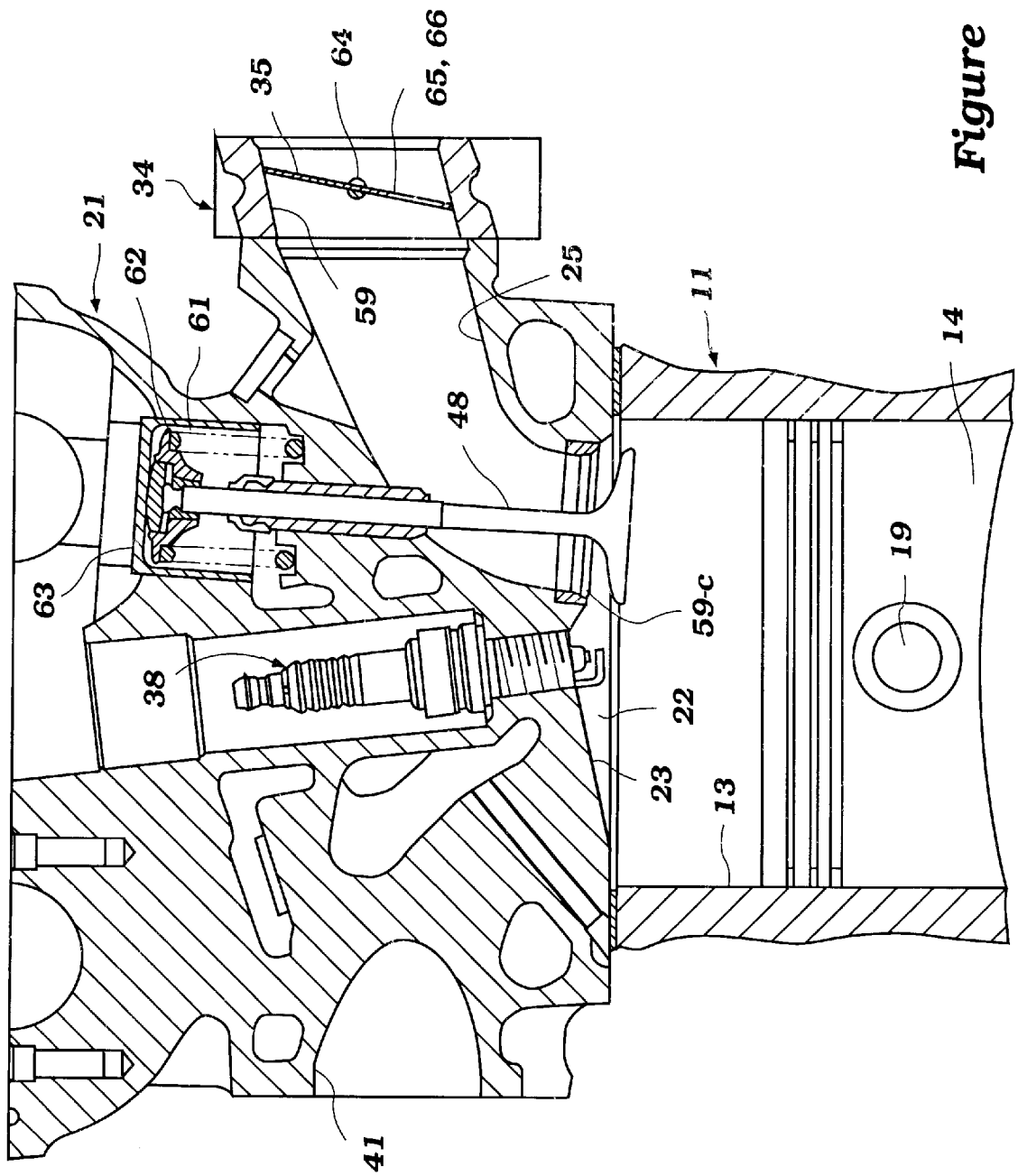
FIG. 3 is a cross-sectional view taken generally along the line 3—3 of FIG. 2.
Figure 4:
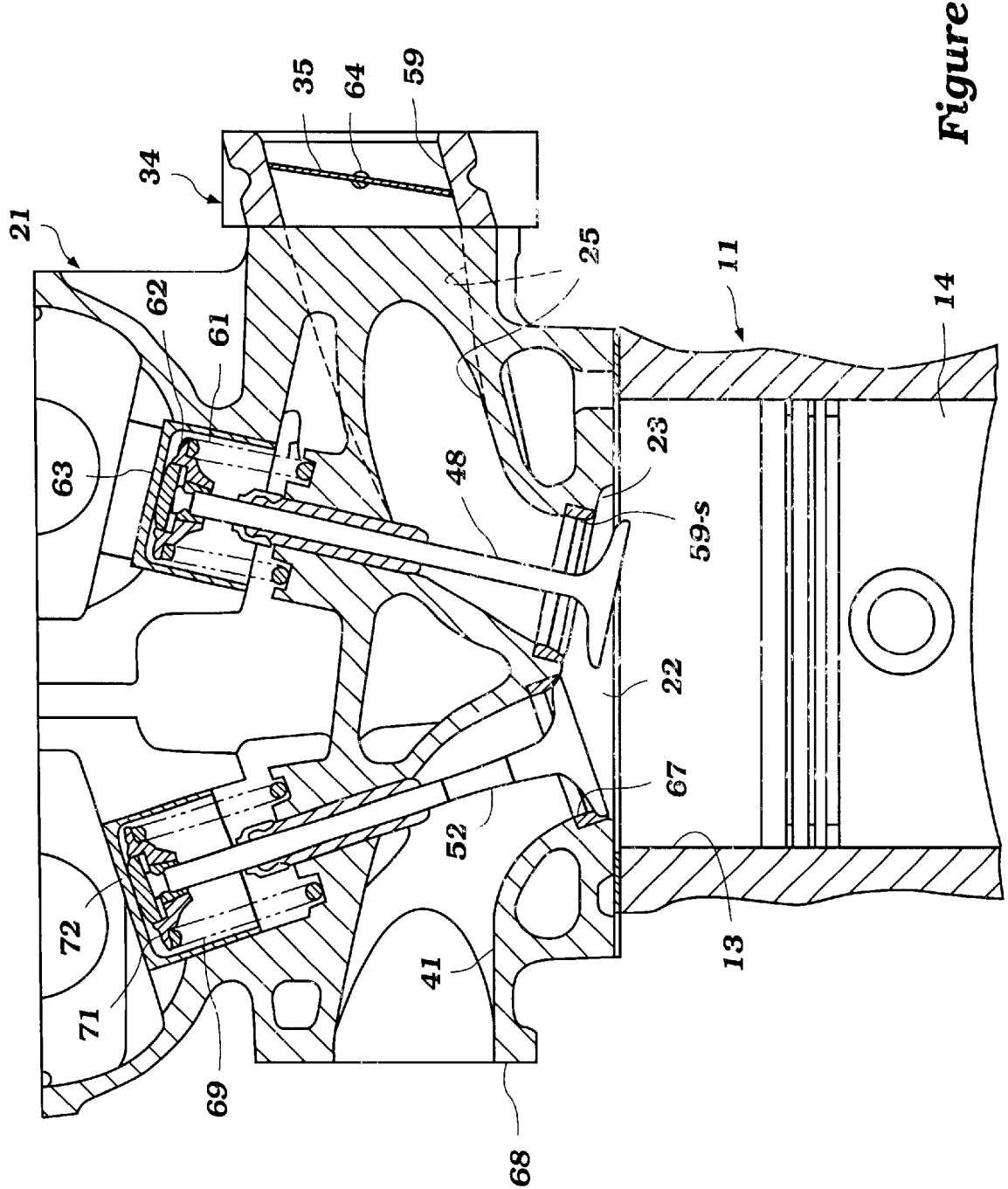
FIG. 4 is a cross-sectional view taken generally along the line 4—4 of FIG. 2.

Spark plugs 38 are mounted in the cylinder head assembly 21 with their spark gaps disposed generally centrally in the combustion chambers 22, when the pistons 14 are at or near top dead center condition, as also seen in FIGS. 2 and 3. Like the fuel injectors 38, the spark plugs 39 are fired by means of an ignition system which is controlled by the ECU 31 in accordance with any desired control strategy.

The charge which is ignited and burned in the combustion chambers 22 by the firing of the spark plugs 38 will expand and drive the pistons 14 downwardly to drive the crankshaft 16. This burnt charge is then exhausted through an exhaust passage arrangement, indicated generally by the reference numeral 41 and which will be described in more detail later by reference to FIGS. 2–4.

However it includes an exhaust manifold, indicated schematically at 42 in FIG. 1, that collects the exhaust gases from the exhaust passages 41 and delivers them to a catalytic converter 43. The outlet from the catalytic converter 43 is then discharged to the atmosphere through a suitable tailpipe arrangement which can include one or more exhaust silencers or mufflers 44.

Preferably, the engine control also includes a feedback control that employs an oxygen sensor, indicated by the reference numeral 45, which is placed in the exhaust manifold 42 upstream of the catalytic converter 43. The output of this oxygen sensor 45 is transmitted to the ECU 31 which can employ a suitable feedback control strategy for maintaining the desired air fuel ratio under widely varying engine running conditions.

In addition to the oxygen sensor 45 and air flow sensor 29, there are provided a number of additional sensors for engine control purposes. The sensors which will be described are to be considered to be only typical of those which may be utilized to practice the invention. Those skilled in the art will readily understand how varying types of control systems may be employed without departing from the spirit and scope of the invention which deals primarily, as has been noted, with the induction control system 37.

These sensors include a throttle position sensor 46 that is mounted in the throttle body 27 and provides a control signal indicative of the position of the throttle valve 28. A pressure and/or temperature sensor 47 may be provided in the intake manifold plenum 32 for providing a signal to the ECU 31 of intake air conditions which may also be used for an idle speed control (ISC) purposes. Such idle speed controls employ bypass passages that extend across the throttle valve 28 and which are controlled to provide more accurate air flow control for controlling the engine idle speed.

It has been noted that the cylinder head intake passages 25 and exhaust passages 41 will be described later. However, while still referring to FIG. 1, it should be noted that there are provided intake valves 48 in the cylinder head intake passages 25 for controlling the communication with the combustion chambers 22. These intake valves 48 are operated by means of an intake cam shaft 49. This intake cam shaft 49 is journaled in the cylinder head assembly 21 and is driven at one half crankshaft speed by a suitable timing drive. This may include a variable valve timing (VVT) mechanism.

A sensor 51 cooperates with the intake cam shaft 49 so as to provide an output signal indicative of the cam shaft position. This may include a cylinder discriminator signal that indicates when a particular cylinder in the engine is at its top dead center condition.

Exhaust valves 52 are mounted in the cylinder head assembly 21 and control the communication of the combustion chambers 22 with the exhaust passages 41. These exhaust valves 52 are operated by means of an exhaust cam shaft 53 which, like the intake cam shaft 49 is driven at one half crankshaft speed by any suitable timing drive. The intake cam shaft 49 and exhaust cam shaft 53 are journaled within a cam chamber 54 of the cylinder head assembly 21 that is closed by a cam cover thereof in a known manner.

There are a number of other sensors provided for engine control. Associated with the crankshaft 16 is a crank angle position sensor 54 which outputs a signal to the ECU 31 that indicates crank angle position. This signal may also be utilized to measure engine speed. An engine water temperature sensor 55 is mounted in the cylinder block 12 and cooperates with the cooling jacket thereof to provide a signal to the ECU 31 indicative of engine temperature. A further sensor 56 may also be mounted in the cylinder block 12 and will provide a signal to the ECU 31 to indicate when a knocking or incipient knocking condition occurs. Then, the ECU 31 may utilize a suitable control strategy so as to reduce or minimize the knocking effect. As previously noted, the various sensors and control strategies thus far described may be of any known type.

Before referring specifically to the induction control 37, the remaining details of the engine construction including the configuration of the intake and exhaust passages 25 and 41 as well as the association of the flow control valve 35 with the intake passages 25 will be described by reference to FIGS. 2–4.

First, the configuration of the intake passage 25 and its associated intake valves 48 will be described. The intake passage 25 is of the Siamesed type and has an inlet opening formed in an outer surface 57 of the cylinder head assembly 21 to which the control valve 34 is affixed. A body 58 of this control valve has a flow passage 59 which registers with and is complimentary to the opening of the cylinder head intake passage 25 in the surface 57.

The intake passage 25 branches into three portions each of which terminates in a respective intake valve seat 59. These intake valve seats 59 are positioned so that there are a pair of them which are disposed outwardly and which may be considered to be side intake valve seats. As such, they are designated by the reference characters 59-S. These side intake valve seats 59-S lie closer to a plane that contains the axis of the cylinder bore 13 and the rotational axis of the crankshaft 16. The remaining intake valve seat 59 comprises a center intake valve seat designated at 59-C. This seat lies further from the aforenoted plane than the side intake valve seats 59-S.

Each of the intake valves 48 has associated with it a coil compression spring arrangement 61 which acts against a keeper retainer assembly 62 for urging the intake valves 48 to their closed positions. Thimble tappets 63 are engaged by the lobes of the intake cam shaft 49 for opening these intake valves 48 in a well known manner.

Referring now specifically to the construction of the flow control valve assembly 34, it includes a valve shaft 64 which is journaled in the valve body 58 and to which the valve element or plate 35 is affixed. As best seen in FIG. 2, this valve plate 35 is formed with a cutout comprised of first and second portions 65 and 66 which are disposed on one side of the plane about which FIG. 3 is taken and which extends perpendicularly to the aforenoted plane. As a result, when the control valve 35 is in its fully closed position (FIG. 2 shows the fully open position while FIGS. 3 and 4 show the fully closed position), there will be no significant flow to the one side intake valve seat 59-S, a partially restricted flow to the center intake valve seat 59-C and little restriction to the flow to the remaining side intake valve seat 59-S.

Thus, the flow into the combustion chamber 22 under this closed position of the control valve 35 will be more toward one side of the cylinder bore 13 so as to create a swirling motion. In addition, the cutouts are such that a greater flow will pass to the upper side of the intake passage 25 in the lower side so that more flow is directed across the cylinder bore in a tumbling fashion when the control valve 35 is closed.

Thus, turbulence will be generated when this valve 35 is closed and the velocity of the intake charge will increase due to the restriction in flow area. As the valve 35 is opened, this action will diminish and when fully opened, the system provides no restriction to the intake flow and no redirection of the flow. The operation of the valve 35 and its control strategy will be described shortly.

Continuing to refer primarily to FIGS. 2–4, the exhaust passage arrangement 41 will now be described. On the opposite side of the aforenoted first plane containing the axis of the cylinder bore, the cylinder head assembly 21 is formed with two intake valve seats 67 which lie on opposite sides of the plane of FIG. 3 and with which the heads of the exhaust valves 52 cooperate. The exhaust passage 41 is Siamesed and terminates in an outlet opening formed in s side surface 68 of the cylinder head assembly 21. The exhaust manifold 42 is affixed in a suitable manner to this opening.

Like the intake valves 48, the exhaust valves 52 are urged to their closed position by means of coil compression spring 69 which act against keeper retainer assemblies 41 for holding the valves 52 in their closed position. Thimble tappets 72 are operated by the lobes of the exhaust cam shaft 53 for opening the exhaust valves 52 at the desired time sequence.

Except for the construction of the flow control valve 35 and its control strategy, the engine configuration as thus far described may be considered to be conventional. Therefore, where any components of the engine or its control strategy have not been described or illustrated, those skilled in the art may readily resort to the utilization of any known construction for practicing the invention.

The arrangements for opening and closing the control valve assembly 34 and specifically the valve plate 35 will now be described by initial primary reference to FIGS. 1 and 5. The control strategy will be described following that initial description by reference to FIGS. 6 and 7.

An actuating lever 73 is affixed to an exposed end of the control valve shaft 64. This control actuator lever 73 is operated by the valve actuating mechanism, indicated generally by the reference numeral 36 and which comprises primarily a diaphragm-type servo motor 74. This servo motor 74 is comprised of an outer housing 75 in which a diaphragm 76 is clamped so as to divide the housing into a pair of chambers 77 and 78. A control rod 78 couples the diaphragm 76 to the actuating lever 73.

The chamber 77 is generally exposed to atmospheric air pressure in any suitable manner. The chamber 78 has positioned within it a coil compression spring and can communicate with either the atmosphere or with a pressure accumulator 81 at lower than atmospheric pressure in manners which will be described and which embody certain features of the invention.

The pressure accumulator 81 is in communication through a conduit 82 with the plenum chamber 32 of the intake manifold. Hence, the pressure in the accumulator chamber 81 will be at a pressure that is below atmospheric pressure but the degree of vacuum will depend upon the engine condition, it should be apparent to those skilled in the art.

First and second control valves, indicated by the reference numerals 85 and 86, control the pressure that is delivered to the chamber 78 and the rate at which the pressure in the chamber 78 varies. The first control valve 85 is of the two-position, two-way type and either communicates the chamber 78 with the control valve 76 or with the atmosphere through an atmospheric port 87.

Figure 5:
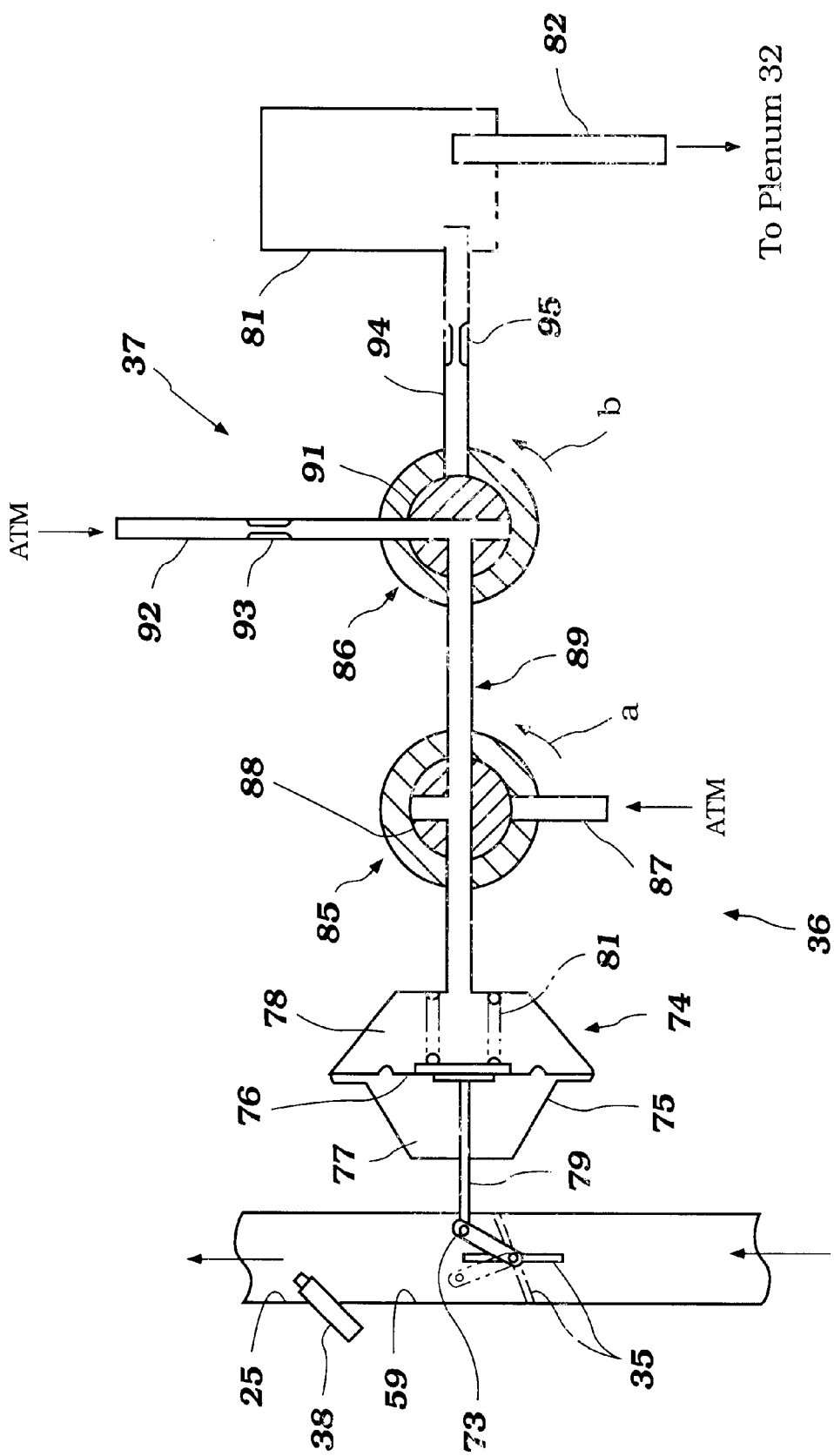
FIG. 5 is an enlarged cross-sectional view showing the arrangement for controlling the operating of the flow control valve.

A valve element 88 of this valve assembly 85 is rotatable in the direction indicated at "a" so as to switch between the position shown in FIG. 5 wherein the pressure in the chamber 78 is determined by the control valve 86 or to a position wherein the valve element 88 opens the chamber 78 to communication with the atmosphere through the port 87.

A conduit 89 connects the first valve body 85 with the second valve body 86. The valve body 86 also contains a valve element 91 which is movable between two positions. In the first position, as shown in FIG. 5, the conduit 89 and, accordingly, the chamber 78 is exposed to the atmosphere through an atmospheric conduit 92 in which a flow restriction 93 is positioned.

In its other position, achieved by rotation in the direction indicated by the arrow "b", the conduit 89 is communicated with a further conduit 94 which, in turn, communicates with the accumulator chamber 81.

A restriction 95 is provided in this conduit so as to restrict the transmission of intake manifold vacuum to the chamber 78 when We valve 86 is rotated in the direction of arrow b to the position that communicates the accumulator chamber 81 with the conduit 89. Thus, when the first valve 85 is in the position shown in FIG. 5, movement of the flow control valve plate 35 between its two positions will be at a somewhat slower restricted rate. When the second valve 82 is in the position shown in FIG. 5, atmospheric pressure will be transmitted at a restricted rate to the chamber 78 and its pressure will increase slowly so as to move the valve 35 from its open position as shown in solid lines to its closed position as shown in phantom lines. This closing will be at a delayed rate and thus will be provide some restriction to changes in flow direction and velocity through the induction system during transient conditions.

On the other hand, when the valve element 91 is rotated in the direction of the arrow b, a vacuum signal will be transmitted to the chamber 78 but at a restricted rate due to the presence of the restriction 95. Hence, under this condition, the control valve 35 will be moved relatively slowly from its closed, flow redirecting, flow accelerating condition to its open, non-flow redirecting, non-flow restricting position.

On the other hand, when the valve element 85 is rotated in the direction of the arrow a to its position for communicating the chamber 78 with the atmosphere through the conduit 87, the control valve 35 will be rapidly moved to its closed flow redirecting, flow restricting position as shown in the phantom line view.

Thus, this construction is operative to provide the following rates of changes of flow control:

1. The flow control valve 35 will be rapidly moved to its closed position (valve 85 open to the atmosphere and the position of valve 86 irrelevant);
2. Control valve 35 slowly opened (valve 85 in the position shown in FIG. 5 and valve 86 also shown in the position of FIG. 5); and
3. Valve 35 slowly opened valve 85 in the position shown in FIG. 5 and valve 86 rotated in the direction of the arrow b in FIG. 50.

Figure 6:
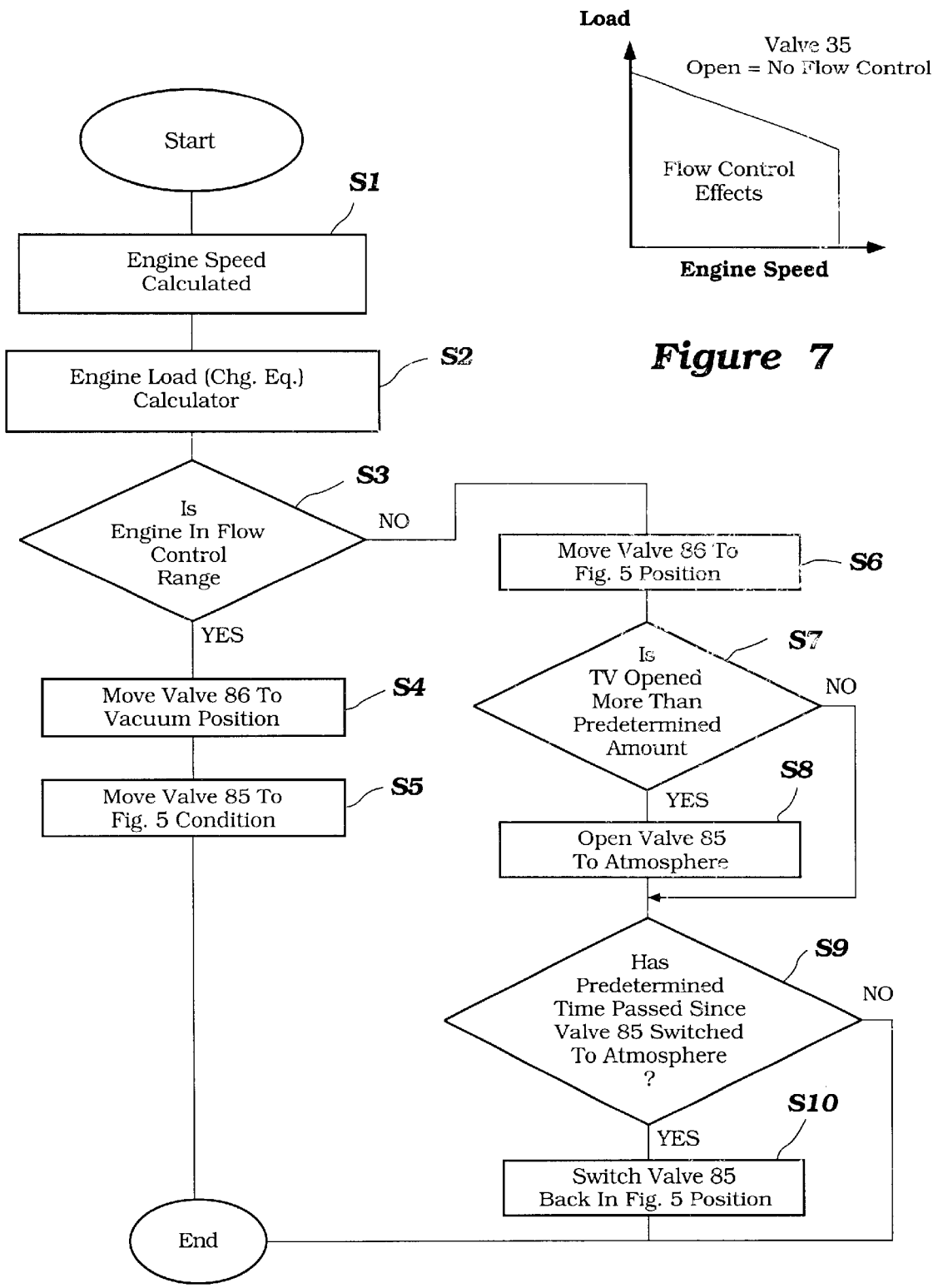
FIG. 6 is a block diagram showing the control routine in accordance with one embodiment of the invention.
Figure 7:
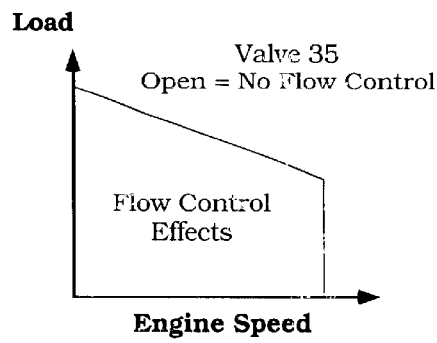
FIG. 7 is a graphical view showing the control phases.

The control strategy will now be described by particular reference to FIGS. 6 and 7. FIG. 7 is basically a curve that shows the flow control valve position for the valve 35 in response to engine speed and engine load. As may be seen, when the engine speed is below a certain value and the load is below a certain value, the flow control is affected and their valve 35 will be closed. This will cause a redirection in flow pattern in the combustion chamber, as aforenoted, and also an increase in flow velocity due to the restriction in flow. Under other conditions, the flow control valve 35 is opened and there will be no flow redirection and no flow restriction.

The program operation will now be described by reference to FIG. 6 wherein the program starts, this being the program affected by the ECU 31, and moves to the step S-1. At this step, the engine speed is calculated. This is done by measuring the pulse outputs from the crank position sensor 54 in relation to time.

Next, the engine load or charging efficiency is determined at the step S-2. This is done either by determining the throttle valve position for the throttle valve 28 from the output of the throttle position sensor 46 or other factors indicative of load which may include the intake manifold vacuum.

The program then moves to the step S-3 so as to consult the map of FIG. 7 to determine whether the system should be operating in the flow control range below the curve of FIG. 7.

If, at the step S-3, it is determined that the engine is operating in the flow control range, then the control valve 35 is moved to its flow control position as shown in the phantom line view of FIG. 5. This is done by first, at the step S-4, moving the valve 86 to its vacuum position by rotating the valve element 91 in the direction of the arrow b. It should be noted that this selling will cause the vacuum condition to be changed gradually so that there will be a gradual closing of the control valve 35.

Then, at the step S-5, the first valve 85 is moved to its FIG. 5 position so that this reduced pressure will be exerted in the chamber 78. The program then ends.

If, however, it is determined at the step S-3 that the engine is not operating in the condition when flow control is desired, then the program moves to the step S-6 so as to operate the second flow control valve 86 to the atmospheric pressure condition as shown in FIG. 5. Then, the program moves to the step S-7 to determine if the load on the engine is high as determined by the throttle valve 28 being opened more than a predetermined amount.

If at the step S-7 it is determined that the throttle valve 28 is open more than a predetermined amount, i.e. the load is high, then the program moves to the step S-8 so as to move the control valve 85 from the position shown in FIG. 5 to the atmospheric pressure side by rotating the valve element 88 in the direction of the arrow a. This will cause atmospheric pressure to be exerted in the chamber 78 and cause the control valve 35 to be moved rapidly to its flow controlling, flow redirecting position so as to provide a quick response in the change in flow conditions.

If, however, at the step S-7 it has been determined that the throttle valve is not open more than a predetermined amount, then the program skips the step S-8 so as to reduce the rate at which the control valve 35 is moved to its flow controlling position.

Either if the program skips immediately from the step S-7 to the step S-9 or proceeds through step S-8 to open the valve 85 to the atmosphere, the program then waits to determine if a predetermined time has passed since the flow control valve 85 has been moved to its atmospheric open condition.

If this time has not passed, the program skips to the end. If, however, at the step S-9 it is determined that the predetermined time period has passed, then the system moves to the step S-10 so as to return the valve 85 from the position where it is exposed unrestrictedly to the atmosphere to the position where it opens communication with the passage 89 so that it will experience either atmospheric pressure at a reduced rate or the pressure in the accumulator chamber 81 at a reduced rate, depending upon the condition of the valve 86. The program then ends.

Figure 8:
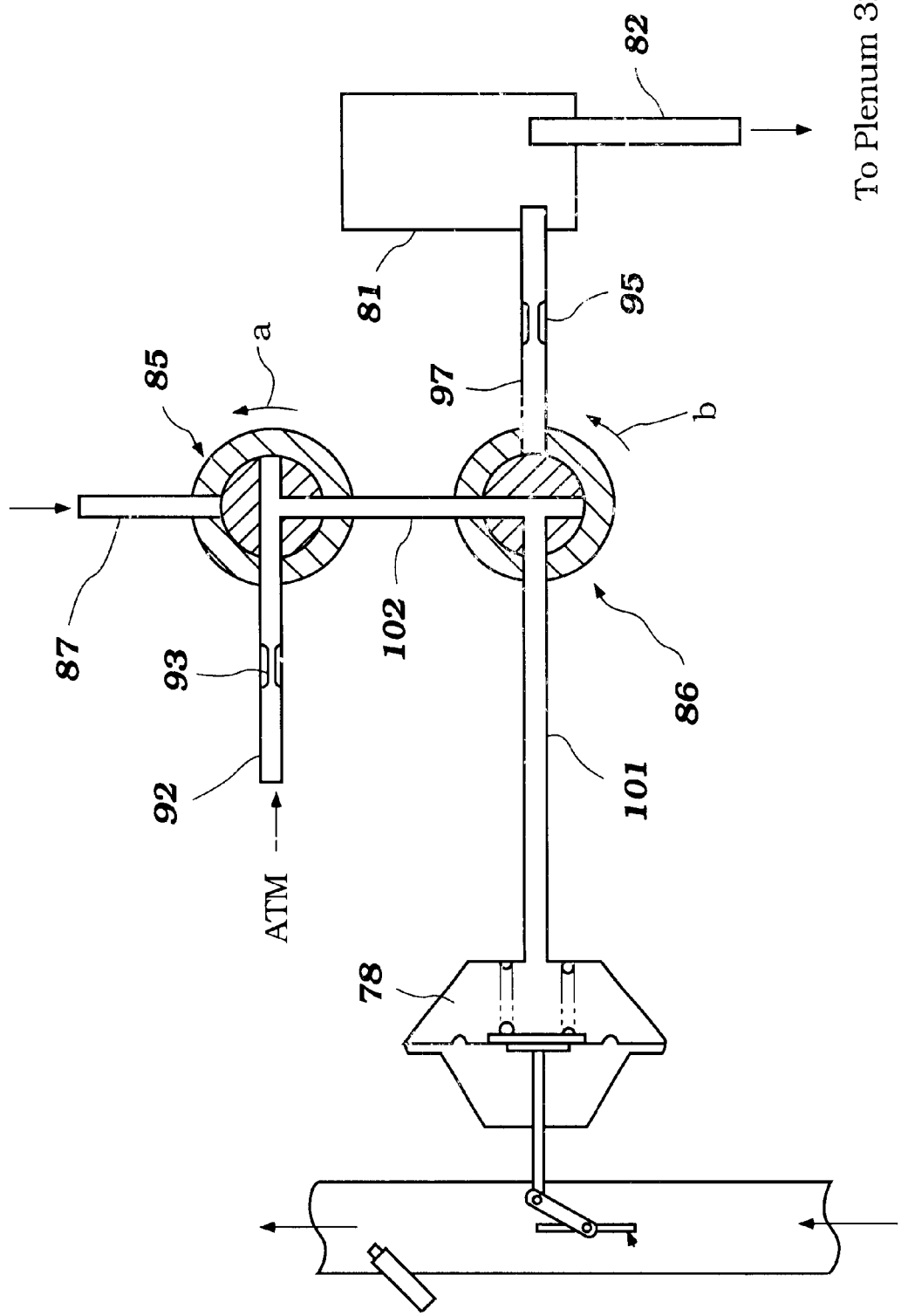
FIG. 8 is a cross-sectional view, in part similar to FIG. 5 and shows another embodiment of the invention.

FIG. 8 is a view in part similar to FIG. 5 and shows another way in which the valves can be positioned in order to achieve the desired rates of movement of the flow control valve 75. Since the components are basically the same except for their organization in the circuitry, they have been identified by the same reference numerals and will be described again only insofar as to understand this embodiment and its operation.

In this embodiment, a conduit 101 interconnects the diaphragm motor chamber 78 to the second flow control valve 86. This flow control valve 86 communicates the conduit 101 either with the accumulator chamber 81 through the conduit 94 with the restriction 95 or with the first valve 85.

The first valve 85 in this embodiment switches between a first condition, as shown in FIG. 8, wherein it communicates directly with the atmosphere through a conduit 92 having a flow restriction 93. A conduit 102 is provided here for communicating the valve 86 with the valve 85. The atmospheric conduit 87 of the valve 85 remains.

Thus, the condition shown in FIG. 8 is the same as that shown in FIG. 5 in that when the valves 85 and 86 are in their respective positions, the chamber 78 is exposed to atmospheric pressure through the restriction so that the valve 35 will be slowly closed. If, however, the valve 86 is rotated in a direction of the arrow d so that the conduit 101 communicates with the conduit 94, the valve 78 will be slowly opened.

Rapid closure of the valve 35 is accomplished by leaving the valve 86 in the condition shown in FIG. 8 and by rotating the valve 85 in the direction of the arrow a so as to expose the chamber 78 rapidly to atmospheric pressure so as to provide a rapid closure of the control valve. Thus, the same type of control routine as shown in FIG. 6 can be employed to achieve the same type of control strategy.

Thus, from the foregoing description, it should be readily apparent that the described embodiments are effective in controlling not only the position of the flow control valve but also its rate of change of position. Of course, the foregoing description is that of preferred embodiment of the invention and various changes and modifications may be made without departing from the spirit and scope of the invention, as defined by the appended claims.

What is claimed is:

1. An internal combustion engine having a combustion chamber, an intake system for supplying at least an air charge to said combustion chamber through an intake port, a flow control valve position within said induction system and in close proximity to said intake port, said flow control valve being movable between a first position wherein at least one of the flow velocity and flow direction into said combustion chamber past said flow control valve is changed and a second position wherein said control valve does not effect any change in the flow past said flow control valve into said combustion chamber through said induction system, means for sensing an engine running condition, means for moving said flow control valve between its first and second positions in response to sensed engine conditions, and means for changing the rate of movement of said control valve between its positions in response to a predetermined sensed engine condition.

2. An internal combustion engine as set forth in claim 1 wherein the rate of change of the position of the control valve is determined by the operator demand on the engine.

3. An internal combustion engine claim 2, wherein the operator demand is determined by sensing the position of a throttle valve in the induction system.

4. An internal combustion engine claim 1, wherein the control valve is moved between one its positions to the other of its positions at one rate if the engine condition is below a predetermined value and at a different rate when the engine condition is above the predetermined value.

5. An internal combustion engine claim 4, wherein the control valve is moved from the other position to the one position at the same rate regardless of the engine condition.

6. An internal combustion engine as set forth in claim 5 wherein the rate of change of the position of the control valve is determined by the operator demand on the engine.

7. An internal combustion engine claim 6, wherein the operator demand is determined by sensing the position of a throttle valve in the induction system.

8. An internal combustion engine claim 7, wherein the control valve is moved between one its positions to the other of its positions at rapid rate if the throttle valve opening is below a predetermined value and at a faster rate when the throttle valve opening is above the predetermined value.

9. An internal combustion engine claim 8, wherein the control valve is moved from the other position to the one position at the same rate regardless of the throttle valve opening.

10. An internal combustion engine as set forth in claim 1 wherein the means for moving the control valve comprises a diaphragm motor having a first chamber exposed to atmospheric pressure and a second chamber, valve means for controlling the communicating of said second chamber with either atmospheric pressure or a sub-atmospheric pressure, depending upon an engine running condition, and for controlling the communication of one of said pressures at either an unrestricted rate or a restrictive rate so as to change the speed of movement of the control valve.

* * * * *